United States Patent
Hower et al.

(10) Patent No.: US 10,678,690 B2
(45) Date of Patent: Jun. 9, 2020

(54) PROVIDING FINE-GRAINED QUALITY OF SERVICE (QOS) CONTROL USING INTERPOLATION FOR PARTITIONED RESOURCES IN PROCESSOR-BASED SYSTEMS

(71) Applicant: QUALCOMM Incorporated, San Diego, CA (US)

(72) Inventors: Derek Robert Hower, Durham, NC (US); Carl Alan Waldspurger, Palo Alto, CA (US); Vikramjit Sethi, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 15/689,543

(22) Filed: Aug. 29, 2017

(65) Prior Publication Data
US 2019/0065374 A1    Feb. 28, 2019

(51) Int. Cl.
*G06F 12/0846*    (2016.01)
*G06F 12/02*    (2006.01)
(Continued)

(52) U.S. Cl.
CPC ........ *G06F 12/0848* (2013.01); *G06F 9/5061* (2013.01); *G06F 12/023* (2013.01);
(Continued)

(58) Field of Classification Search
CPC ............. G06F 12/0848; G06F 13/1663; G06F 12/023; G06F 2212/282; G06F 2212/1044
See application file for complete search history.

(56) References Cited

U.S. PATENT DOCUMENTS

| | | | | |
|---|---|---|---|---|
| 6,493,800 B1 * | 12/2002 | Blumrich | .............. | G06F 12/084 |
| | | | | 711/129 |
| 8,250,332 B2 * | 8/2012 | Plondke | ................ | G06F 12/127 |
| | | | | 711/153 |

(Continued)

OTHER PUBLICATIONS

International Search Report and Written Opinion for PCT/US2018/045370, dated Nov. 9, 2018, 13 pages.

*Primary Examiner* — Francisco A Grullon
(74) *Attorney, Agent, or Firm* — Withrow & Terranova, PLLC

(57) ABSTRACT

Providing fine-grained Quality of Service (QoS) control using interpolation for partitioned resources in processor-based systems is disclosed. In this regard, in one aspect, a processor-based system provides a partitioned resource (such as a system cache or memory access bandwidth to a shared system memory) that is subdivided into a plurality of partitions, and that is configured to service a plurality of resource clients. A resource allocation agent of the processor-based system provides a plurality of allocation indicators corresponding to each combination of resource client and partition, and indicating an allocation of each partition for each resource client. The resource allocation agent allocates the partitioned resource among the resource clients based on an interpolation of the plurality of allocation indicators. Because each allocation indicator may be different for each combination of resource client and partition, interpolation of the allocation indicators provides a higher-resolution aggregate resource allocation for each resource client.

21 Claims, 8 Drawing Sheets

(51) Int. Cl.
*G06F 13/16* (2006.01)
*G06F 9/50* (2006.01)
*G06F 12/0842* (2016.01)

(52) U.S. Cl.
CPC ...... *G06F 12/0842* (2013.01); *G06F 13/1663* (2013.01); *G06F 2212/1044* (2013.01); *G06F 2212/282* (2013.01); *G06F 2212/70* (2013.01)

(56) References Cited

U.S. PATENT DOCUMENTS

| | | | |
|---|---|---|---|
| 8,543,769 B2 | 9/2013 | Rajamony et al. | |
| 8,739,159 B2* | 5/2014 | Lin | G06F 12/0842 |
| | | | 711/129 |
| 8,898,422 B2 | 11/2014 | Jung et al. | |
| 9,612,970 B2* | 4/2017 | Palacharla | G06F 12/0893 |
| 9,678,875 B2* | 6/2017 | Hower | G06F 12/0842 |
| 9,734,070 B2* | 8/2017 | Artieri | G06F 12/084 |
| 9,824,015 B2* | 11/2017 | Podaima | G06F 12/0848 |
| 2002/0108021 A1* | 8/2002 | Syed | G06F 12/0846 |
| | | | 711/128 |
| 2003/0172234 A1* | 9/2003 | Soltis, Jr. | G06F 12/0811 |
| | | | 711/122 |
| 2009/0307434 A1* | 12/2009 | Sivaramakrishnan | |
| | | | G06F 12/0607 |
| | | | 711/147 |
| 2011/0022773 A1* | 1/2011 | Rajamony | G06F 12/084 |
| | | | 711/3 |
| 2011/0307664 A1* | 12/2011 | Paver | G06F 12/0895 |
| | | | 711/128 |
| 2013/0304994 A1 | 11/2013 | Koob et al. | |
| 2014/0173211 A1* | 6/2014 | Loh | G06F 12/0842 |
| | | | 711/129 |
| 2015/0293709 A1 | 10/2015 | Quach et al. | |
| 2016/0147656 A1* | 5/2016 | Hower | G06F 12/0842 |
| | | | 711/130 |
| 2018/0217941 A1* | 8/2018 | Horovitz | G06F 12/0871 |

* cited by examiner

PROVIDING FINE-GRAINED QUALITY OF SERVICE (QOS) CONTROL USING INTERPOLATION FOR PARTITIONED RESOURCES IN PROCESSOR-BASED SYSTEMS

BACKGROUND

I. Field of the Disclosure

The technology of the disclosure relates generally to partitioned resources in processor-based systems, and, in particular, to Quality of Service (QoS) mechanisms for partitioned resources.

II. Background

Conventional processor-based systems provide resources, such as system caches and/or memory access bandwidth, which may be shared among multiple resource clients. To increase parallelism, a resource may be subdivided into partitions that may be operated and/or accessed largely independently of one another. For instance, a system cache (e.g., a last-level cache, as a non-limiting example) may be partitioned into multiple "slices" or "instances," each providing a same number of cache ways. Cache access operations by different resource clients may be assigned to one of the cache partitions using conventional address-to-partition mapping techniques based on, for example, hashes of memory addresses of cache access operations.

To facilitate sharing, a Quality of Service (QoS) mechanism may selectively allocate portions of a resource among difference resource clients, which may operate under different priorities, relative importance, and/or performance goals. For instance, in the cache example described above, a "way mask" (i.e., a bit mask including a bit for each cache way) corresponding to a resource client may be used to allocate a subset of the cache ways for each cache partition for use by that resource client. As a non-limiting example, a 20-way set-associative cache may be subdivided into eight (8) partitions, with each resource client's way mask having 20 bits to indicate which of the 20 ways are allocated to that resource client. Because each resource client's way mask is applied to all partitions, the minimum cache space that can be allocated to each resource client is 5%, or one (1) of the 20 ways over the eight (8) partitions.

Likewise, memory access bandwidth may also be allocated using conceptually similar controls. As an example, a processor-based system may provide four (4) memory controllers as memory access bandwidth providers. Each resource client may be assigned a "memory stride value" of four (4) bits to indicate how requests for memory bandwidth are weighted for that resource client, with a lower memory stride value indicating a higher weight. Because the memory stride value may have 16 different values (i.e., 0-15), the minimum memory access bandwidth that can be allocated to each resource client is 6.25% (or $\frac{1}{16}$) of the total memory access bandwidth.

However, finer-grained QoS control may be desirable for allocation of shared resources. The QoS mechanisms described above permit only relatively coarse-grained controls that limit allocation resolution and restrict the number of resource clients that may access a given shared resource. Moreover, many mechanisms for implementing fine-grained QoS control may result in higher hardware implementation costs.

SUMMARY OF THE DISCLOSURE

Aspects according to the disclosure include providing fine-grained Quality of Service (QoS) control using interpolation for partitioned resources in processor-based systems. In this regard, in one aspect, a processor-based system provides a partitioned resource (i.e., a system cache or memory access bandwidth to a shared system memory, as non-limiting examples) that is subdivided into a plurality of partitions and configured to service a plurality of resource clients. For each combination of resource client and partition, an allocation indicator is provided to indicate an allocation of the partition for the resource client. As a non-limiting example, aspects in which the partitioned resource is a partitioned cache having a plurality of ways may provide an allocation indicator to indicate how many ways of the partition may be allocated to the resource client. Similarly, aspects in which the partitioned resource is a plurality of memory access bandwidth providers may provide that the allocation indicator indicates a stride to be applied by a memory controller when performing a memory access operation for the resource client.

Because each allocation indicator may be different for each combination of resource client and partition, interpolation of the allocation indicators provides a higher-resolution aggregate resource allocation for each resource client. For instance, if the partitioned resource is a 10-way set-associative cache divided into four (4) partitions, conventional QoS mechanisms would only allow the cache to be allocated with a minimum resolution of 10% (i.e., a minimum allocation is 1 way out of 10). However, according to aspects disclosed herein, the allocation indicators for a given resource client may vary for each partition. As a non-limiting example, a resource client may be allocated 50% of the first and second partitions, and 60% of the third and fourth partitions. This results in a total aggregate allocation of the cache of 55% for the resource client.

In another aspect, a processor-based system for providing fine-grained QoS control of partitioned resources is disclosed. The processor-based system comprises a partitioned resource subdivided into a plurality of partitions and configured to service a plurality of resource clients. The processor-based system further comprises a resource allocation agent and a plurality of allocation indicators, each corresponding to a partition of the plurality of partitions and a resource client of a plurality of resource clients, and representing an allocation of the partition for the resource client. The resource allocation agent is configured to allocate the partitioned resource among the plurality of resource clients based on an interpolation of the plurality of allocation indicators for each resource client of the plurality of resource clients.

In another aspect, a processor-based system for providing fine-grained QoS control of partitioned resources is disclosed. The processor-based system comprises a means for allocating a partitioned resource, subdivided into a plurality of partitions, among a plurality of resource clients based on an interpolation of a plurality of allocation indicators, each corresponding to a partition of the plurality of partitions and a resource client of the plurality of resource clients, and representing an allocation of the partition for the resource client.

In another aspect, a method for providing fine-grained QoS control of partitioned resources is disclosed. The method comprises allocating, by a resource allocation agent of a processor-based system, a partitioned resource, subdivided into a plurality of partitions, among a plurality of resource clients based on an interpolation of a plurality of allocation indicators, each corresponding to a partition of the plurality of partitions and a resource client of the plurality of resource clients, and representing an allocation of the partition for the resource client.

In another aspect, a non-transitory computer-readable medium is provided. The non-transitory computer-readable medium stores thereon computer-executable instructions which, when executed by a processor, cause the processor to allocate a partitioned resource, subdivided into a plurality of partitions, among a plurality of resource clients based on an interpolation of a plurality of allocation indicators, each corresponding to a partition of the plurality of partitions and a resource client of the plurality of resource clients, and representing an allocation of the partition for the resource client.

DETAILED DESCRIPTION

Figure 1:
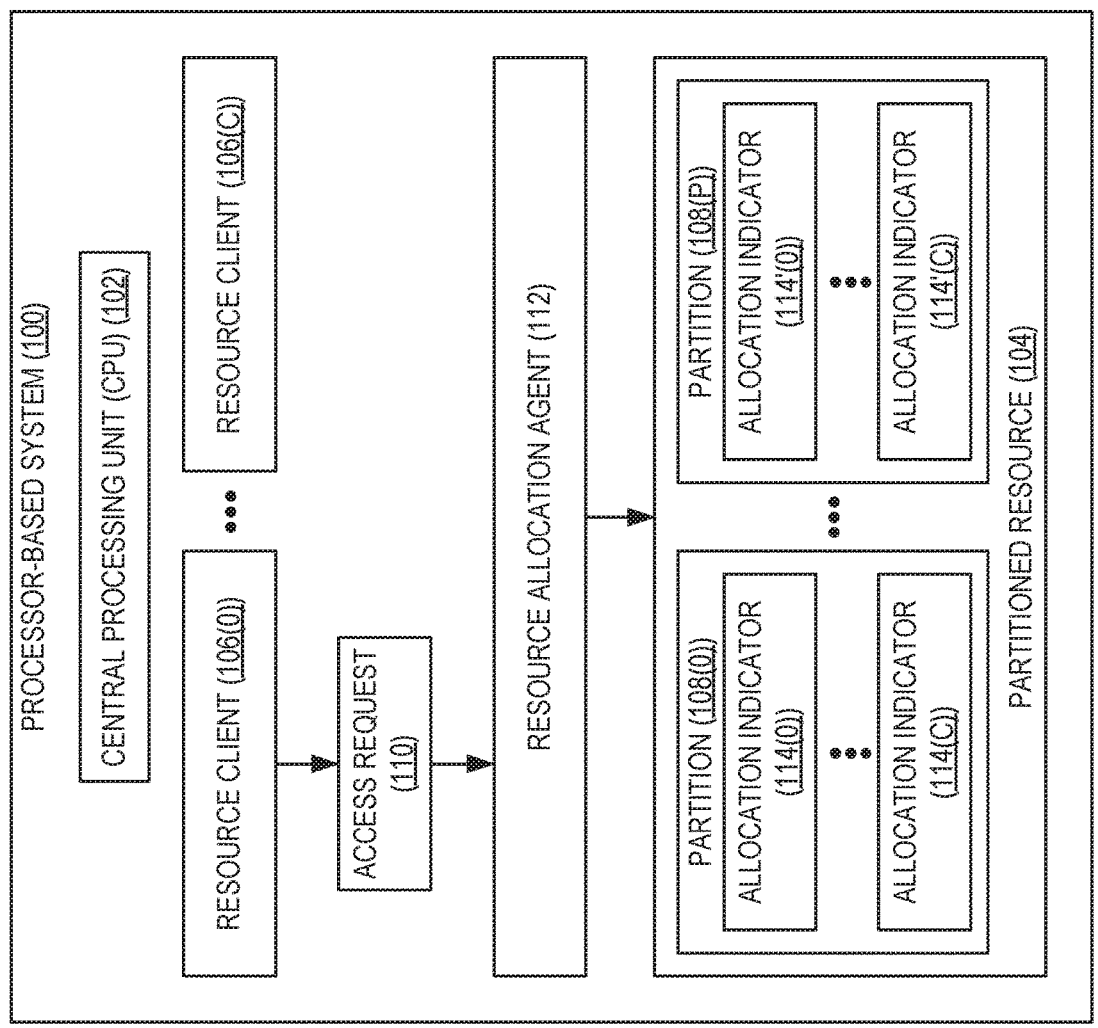
FIG. 1 is a block diagram of an exemplary processor-based system for providing fine-grained Quality of Service (QoS) control using interpolation for partitioned resources by employing a resource allocation agent and allocation indicators.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing fine-grained Quality of Service (QoS) control using interpolation for partitioned resources in processor-based systems. In this regard, FIG. 1 illustrates an exemplary processor-based system 100 that includes a central processing unit (CPU) 102 and a partitioned resource 104 that is shared among multiple resource clients 106(0)-106(C). The partitioned resource 104 according to some aspects may comprise a system cache, such as a last-level cache, and/or memory access bandwidth for a shared system memory accessible via a plurality of memory controllers (not shown). The resource clients 106(0)-106(C) may comprise concurrently executing software processes, virtual machines, hardware devices, or other entities configured to access the partitioned resource 104, as non-limiting examples. It is to be understood that the processor-based system 100 of FIG. 1 may encompass any one of known digital logic elements, semiconductor circuits, and processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based system 100 may include elements in addition to those illustrated in FIG. 1.

To facilitate parallel usage by the resource clients 106(0)-106(C) of the partitioned resource 104, the processor-based system 100 provides that the partitioned resource 104 is subdivided into a plurality of partitions 108(0)-108(P), each of which may be further divided into sub-units that can be selectively allocated among the resource clients 106(0)-106(C). For instance, in aspects of the processor-based system 100 in which the partitioned resource 104 comprises a system cache (e.g., a last-level cache, as a non-limiting example), the partitions 108(0)-108(P) may comprise cache "slices" or "instances," each of which provides a same number of cache ways. Similarly, aspects of the processor-based system 100 in which the partitioned resource 104 comprises memory access bandwidth providers for a shared system memory may provide that each of the partitions 108(0)-108(P) comprises a memory access bandwidth provider such as a memory controller. In both aspects, an access request 110 from a resource client 106(0)-106(C), such as the resource client 106(0), is assigned to one of the partitions 108(0)-108(P) based on, for example, a hash of a memory address associated with the access request 110.

However, as noted above, conventional QoS mechanisms for allocating the partitioned resource 104 among the resource clients 106(0)-106(C) may not provide sufficient allocation resolution (i.e., the smallest allocatable portion of the partitioned resource 104 that can be allocated by the QoS mechanism may still be too large for precise allocation). Moreover, such coarse-grained QoS mechanisms may impose an inherent limit on the number of resource clients that may access a given shared resource. Thus, it is desirable to implement a fine-grained QoS mechanism to provide higher allocation resolution without incurring excessively higher hardware implementation costs.

In this regard, the processor-based system 100 of FIG. 1 provides a resource allocation agent 112. While the resource allocation agent 112 is illustrated as a standalone element in FIG. 1, in some aspects the resource allocation agent 112 may be integrated into the CPU 102, into a cache controller (not shown) or a memory management unit (MMU) (not shown), integrated into or distributed across other elements of the processor-based system 100, and/or implemented in part by a software entity (not shown) such as an operating system or a hypervisor executed by the CPU 102 of the processor-based system 100. The resource allocation agent 112 employs a plurality of allocation indicators 114(0)-114(C), 114'(0)-114'(C) associated with the partitions 108(0)-108(P). Each of the allocation indicators 114(0)-114(C), 114'(0)-114'(C) corresponds to a unique combination of one of the resource clients 106(0)-106(C) and one of the partitions 108(0)-108(P), and represents an allocation of the partition 108(0)-108(P) for the corresponding resource client 106(0)-106(C). For example, in FIG. 1, assume that the allocation indicator 114(0) corresponds to the partition 108(0) for the resource client 106(0), while the allocation indicator 114'(0) corresponds to the partition 108(P) for the resource client 106(0). Depending on whether the access request 110 is assigned to the partition 108(0) or the partition 108(P), either the allocation indicator 114(0) or the allocation indicator 114'(0) will be used by the resource allocation agent 112 to determine how much of the corresponding partition 108(0), 108(P) may be allocated to the resource client 106(0) to satisfy the access request 110.

Unlike conventional QoS mechanisms, each of the allocation indicators 114(0)-114(C), 114'(0)-114'(C) for a given one of the resource clients 106(0)-106(C) may vary across different partitions 108(0)-108(P). As a result, a resource client such as the resource client 106(0) may be allocated different portions of each of the partitions 108(0)-108(P). By interpolating the different allocation indicators 114(0)-114(C), 114'(0)-114'(C), a higher allocation resolution may be attained, thus enabling a smaller portion of the partitioned resource 104 to be allocated to each of the resource clients 106(0)-106(C) if desired.

Figure 2:
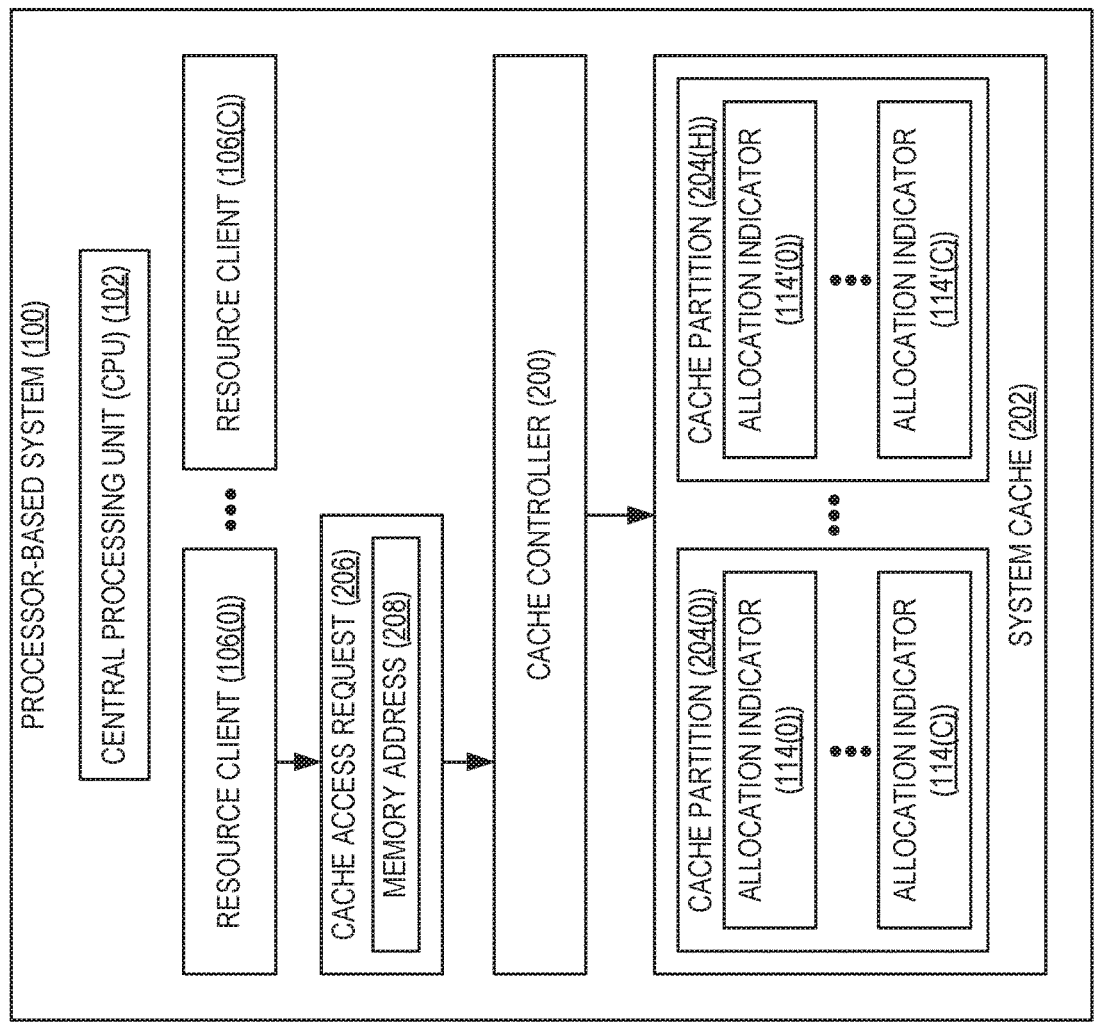
FIG. 2 is a block diagram of an exemplary implementation of the processor-based system of FIG. 1 including a system cache and a cache controller.
Figure 3:
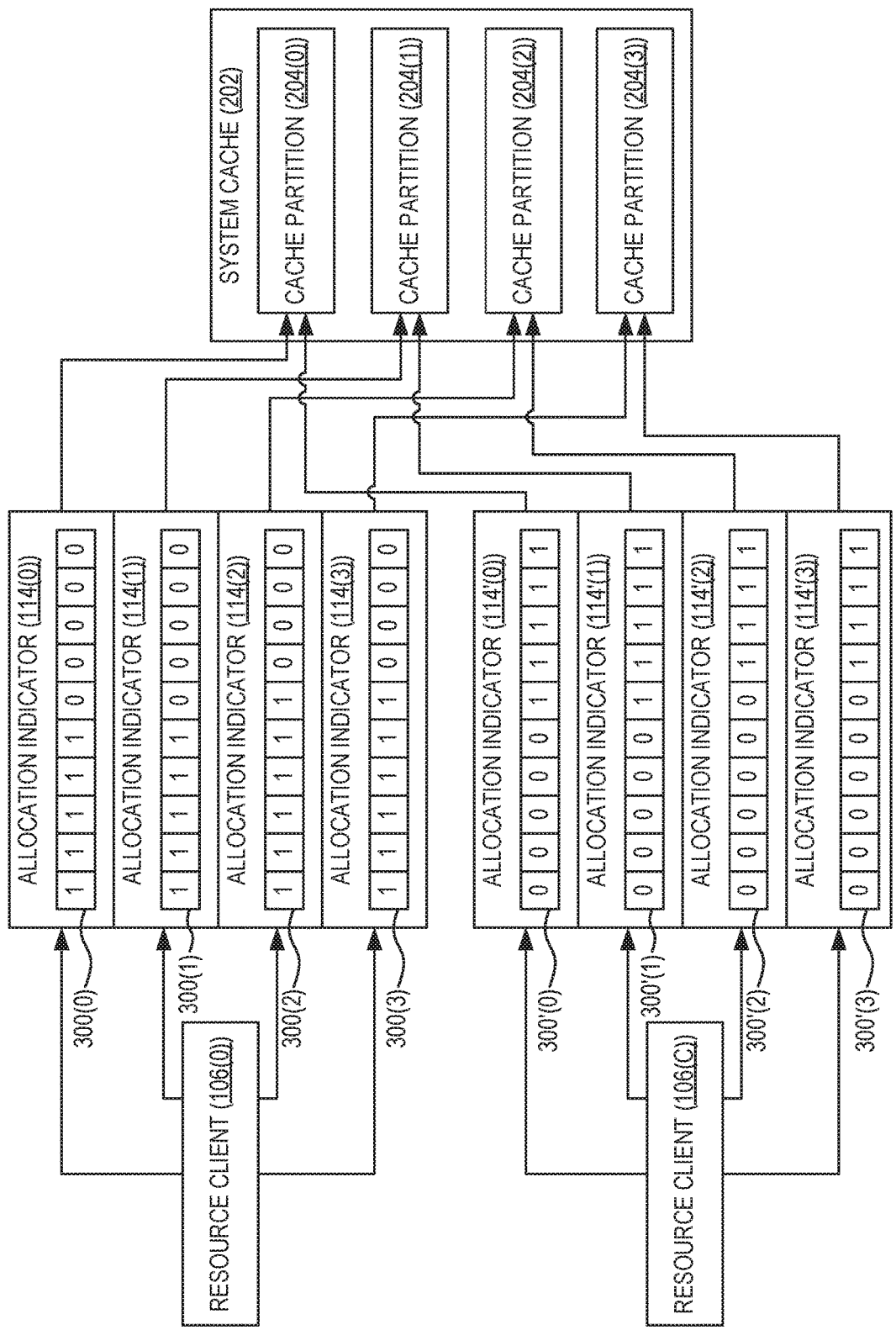
FIG. 3 is a block diagram illustrating an exemplary interpolation of allocation indicators by the cache controller of FIG. 2 to provide fine-grained QoS control of the system cache of FIG. 2.
Figure 4:
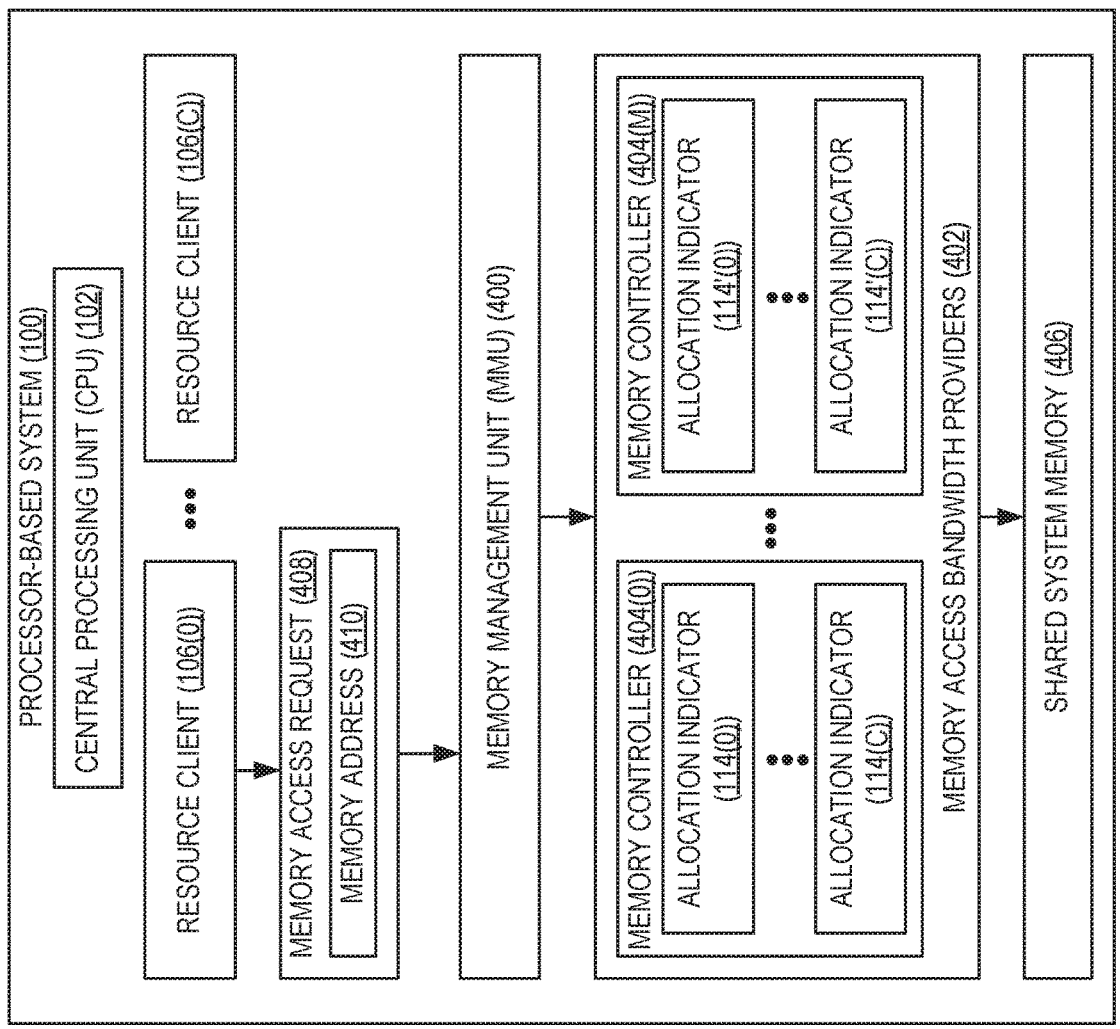
FIG. 4 is a block diagram of an exemplary implementation of the processor-based system of FIG. 1 including a shared system memory and a memory management unit (MMU)
Figure 5:
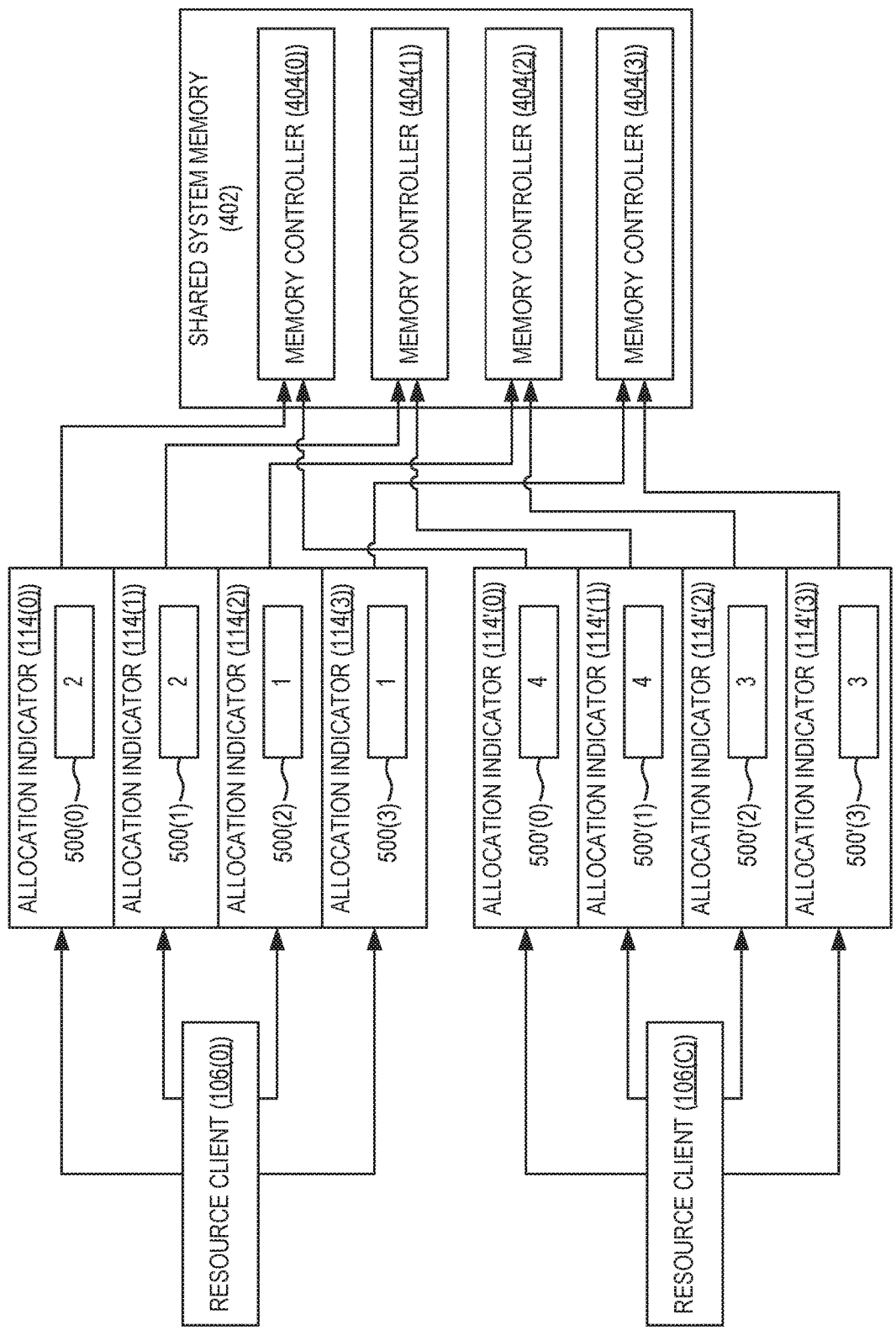
FIG. 5 is a block diagram illustrating an exemplary interpolation of allocation indicators by the MMU of FIG. 4 to provide fine-grained QoS control of memory access bandwidth for the shared system memory of FIG. 4.

To illustrate exemplary aspects of the processor-based system 100, FIGS. 2-5 are provided. FIG. 2 illustrates an exemplary implementation of the processor-based system 100 of FIG. 1 wherein the partitioned resource 104 comprises a system cache and the resource allocation agent 112 comprises a cache controller, while FIG. 4 illustrates an exemplary implementation of the processor-based system 100 of FIG. 1 wherein the partitioned resource 104 comprises memory access bandwidth providers for a shared system memory and the resource allocation agent 112 comprises an MMU. FIGS. 3 and 5 are provided to illustrate how interpolation of the allocation indicators 114(0)-114(C), 114'(0)-114'(C) provides fine-grained QoS control in each of the aforementioned aspects.

As seen in FIG. 2, one aspect of the processor-based system 100 may provide a cache controller 200 corresponding to the resource allocation agent 112 of FIG. 1. FIG. 2 further provides a system cache 202 that corresponds to the partitioned resource 104 of FIG. 1, and a plurality of cache partitions 204(0)-204(H) corresponding to the partitions 108(0)-108(P) of FIG. 1. Accordingly, disclosures herein regarding the resource allocation agent 112, the partitioned resource 104, and the partitions 108(0)-108(P) of FIG. 1 apply to the cache controller 200, the system cache 202, and the cache partitions 204(0)-204(H), respectively, of FIG. 2. The system cache 202 may comprise a Level 1 (L1) cache, a Level 2 (L2) cache, a Level 3 (L3) cache, and/or a last-level cache, as non-limiting examples. Upon receiving a cache access request 206 comprising a memory address 208, the cache controller 200 assigns the cache access request 206 to one of the cache partitions 204(0)-204(H) (e.g., based on a hash of the memory address 208).

The allocation indicators 114(0)-114(C), 114'(0)-114'(C) in the example of FIG. 2 each comprise a way mask (not shown) providing a plurality of bit indicators (not shown). Each bit indicator of the allocation indicators 114(0)-114(C), 114'(0)-114'(C) corresponds to one way of one of the cache partitions 204(0)-204(H) of the system cache 202, and indicates whether the corresponding way has been allocated to the associated resource client 106(0)-106(C). Using the way masks provided by the allocation indicators 114(0)-114(C), 114'(0)-114'(C), the cache controller 200 allocates a portion of the assigned cache partition 204(0)-204(H) to carry out the cache access request 206 on behalf of the resource client 106(0)-106(C).

FIG. 3 provides a more detailed illustration of how the allocation indicators 114(0)-114(C), 114'(0)-114'(C) in the example of FIG. 2 may be interpolated to provide fine-grained QoS control of the system cache 202 of FIG. 2. In this example, assume that the number of cache partitions 204(0)-204(H) is four (i.e., H=3), and further that the cache partitions 204(0)-204(3) of the system cache 202 are made up of 10 ways. Accordingly, the allocation indicators 114(0)-114(3), 114'(0)-114'(3) provide way masks 300(0)-300(3), 300'(0)-300'(3), each of which is made up of 10 bits corresponding to the 10 ways. The allocation indicators 114(0)-114(3) represent the allocation of the cache partitions 204(0)-204(3), respectively, of the system cache 202 for the resource client 106(0). The allocation indicators 114'(0)-114'(3) similarly represent the allocation of the cache partitions 204(0)-204(3), respectively, of the system cache 202 for the resource client 106(C).

Because the system cache 202 in this example is made up of 10 ways, a conventional QoS mechanism would be able to allocate the system cache 202 only in increments of 10%. However, by interpolating the allocation indicators 114(0)-114(3), 114'(0)-114'(3) to determine aggregate allocations of the system cache 202 for the resource clients 106(0), 106(C), a higher allocation resolution can be attained. In the example of FIG. 3, instead of a resolution of 10%, the system cache 202 may be allocated in increments as small as 2.5% (i.e., the number of ways (10) divided by the number of cache partitions 204(0)-204(3), in this example) by allocating one (1) way in one (1) of the cache partitions 204(0)-204(3), and allocating zero (0) ways allocated in the remaining cache partitions 204(0)-204(3). It is to be understood that the percentages discussed above are specific to the example of FIG. 3, and may vary in some aspects according to the number of ways and the number of cache partitions 204(0)-204(H).

In the example of FIG. 3, the allocation indicators 114(0) and 114(1) have the first five (5) bit indicators set to a value of one (1), indicating that the first five (5) ways (i.e., 50%) of the cache partitions 204(0) and 204(1), respectively, are allocated to the resource client 106(0). The allocation indicators 114(2) and 114(3) have the first six (6) bit indicators set to a value of one (1), indicating that the first six (6) ways (i.e., 60%) of the cache partitions 204(2) and 204(3), respectively, are allocated to the resource client 106(0). Thus, the total aggregate allocation of the system cache 202 for the resource client 106(0) is 55% (i.e., (50+50+60+60)/4). Likewise, the allocation indicators 114'(0) and 114'(1) have the last five (5) bit indicators set to a value of one (1), indicating that the last five (5) ways (i.e., 50%) of the cache partitions 204(0) and 204(1), respectively, are allocated to the resource client 106(C). The allocation indicators 114'(2) and 114'(3) have the last four (4) bit indicators set to a value of one (1), indicating that the last four (4) ways (i.e., 40%) of the cache partitions 204(2) and 204(3), respectively, are allocated to the resource client 106(C). The total aggregate allocation of the system cache 202 for the resource client 106(C) is therefore 45% (i.e., (50+50+40+40)/4), an allocation that would not be possible using conventional QoS mechanisms with coarser resolutions.

Referring now to FIG. 4, in another aspect, the processor-based system 100 of FIG. 1 may provide an MMU 400 corresponding to the resource allocation agent 112 of FIG. 1, memory access bandwidth providers 402 that corresponds to the partitioned resource 104 of FIG. 1, and a plurality of memory controllers 404(0)-404(M) corresponding to the partitions 108(0)-108(P) of FIG. 1. Disclosures herein regarding the resource allocation agent 112, the partitioned resource 104, and the partitions 108(0)-108(P) of FIG. 1 thus may apply to the MMU 400, the memory access bandwidth providers 402, and the memory controllers 404(0)-404(M), respectively, of FIG. 4. The processor-based system 100 also includes a shared system memory 406 that is accessible by the resource clients 106(0)-106(C) via the memory controllers 404(0)-404(M). In some aspects, the shared system memory 406 may comprise dynamic random access memory (DRAM), as a non-limiting example.

In the example of FIG. 4, the allocation indicators 114(0)-114(C), 114'(0)-114'(C) each comprise a memory stride value (not shown) that indicates a weight associated with requests for memory access bandwidth for the corresponding resource client 106(0)-106(C). In some aspects, the memory stride values are inversely proportional to the weight assigned to the requests for memory access bandwidth, such that a lower memory stride value indicates a higher weight. When the MMU 400 receives a memory access request 408 comprising a memory address 410, the MMU 400 assigns the memory access request 408 to be handled by one of the memory controllers 404(0)-404(M). As a non-limiting example, the memory access request 408 may be assigned to one of the memory controllers 404(0)-404(M) based on a hash of the memory address 410.

FIG. 5 illustrates in greater detail how fine-grained QoS control of the memory access bandwidth providers 402 of FIG. 4 may be provided by interpolating the allocation indicators 114(0)-114(C), 114'(0)-114'(C). In FIG. 5, it is assumed that the number of memory controllers 404(0)-404(M) is four (i.e., M=3). The allocation indicators 114(0)-114(3), 114'(0)-114'(3) provide memory stride values 500(0)-500(3), 500'(0)-500'(3) that have a size of four (4) bits and that indicate the relative weights assigned to requests for memory access bandwidth for the corresponding resource clients 106(0)-106(C) and the memory controllers 404(0)-404(3). In particular, the allocation indicators 114(0)-114(3) represent the allocations of the memory controllers 404(0)-404(3), respectively, of the memory access bandwidth providers 402 for the resource client 106(0), while the allocation indicators 114'(0)-114'(3) represent the allocations of the memory controllers 404(4)-404(3), respectively, of the memory access bandwidth providers 402 for the resource client 106(C).

Because there are 16 possible values for each of the four-bit memory stride values 500(0)-500(3), 500'(0)-500'(3), a conventional QoS mechanism would be able to allocate the memory access bandwidth providers 402 only in increments of 6.25% (i.e., ¹⁄₁₆). In the example of FIG. 5, though, a higher allocation resolution can be achieved by interpolating the allocation indicators 114(0)-114(3), 114'(0)-114'(3) to provide fractional memory stride values for the resource clients 106(0), 106(C). In the example of FIG. 5, instead of a resolution of 6.25%, the memory access bandwidth providers 402 may be allocated in increments as small as 1.5625% (i.e., ¹⁄₁₆ divided by the number of memory controllers 404(0)-404(3), in this example) by selecting a memory stride value 500(0)-500(3), 500'(0)-500'(3) of one (1) for one (1) of the memory controllers 404(0)-404(M), and selecting a memory stride value 500(0)-500(3), 500'(0)-500'(3) of zero (0) in the remaining memory controllers 404(0)-404(3). It is to be understood that the percentages discussed above are specific to the example of FIG. 5, and may vary in some aspects according to the size of the memory stride values 500(0)-500(3), 500'(0)-500'(3) and the number of memory controllers 404(0)-404(3).

As seen in FIG. 5, the allocation indicators 114(0) and 114(1) have been assigned the memory stride values 500(0) and 500(1), respectively, each having a value of two (2). The allocation indicators 114(2) and 114(3) have been assigned the memory stride values 500(2) and 500(3), respectively, each of which has a value of one (1) Thus, the total aggregate memory stride value of the memory access bandwidth providers 402 for the resource client 106(0) is 1.5. Similarly, the allocation indicators 114'(0) and 114'(1) have been assigned the memory stride values 500'(0) and 500'(1), respectively, each having a value of four (4), while the allocation indicators 114'(2) and 114'(3) have been assigned the memory stride values 500'(2) and 500'(3), respectively, each having a value of three (3). The total aggregate memory stride value of the memory access bandwidth providers 402 for the resource client 106(C) is therefore 3.5.

Figure 6:
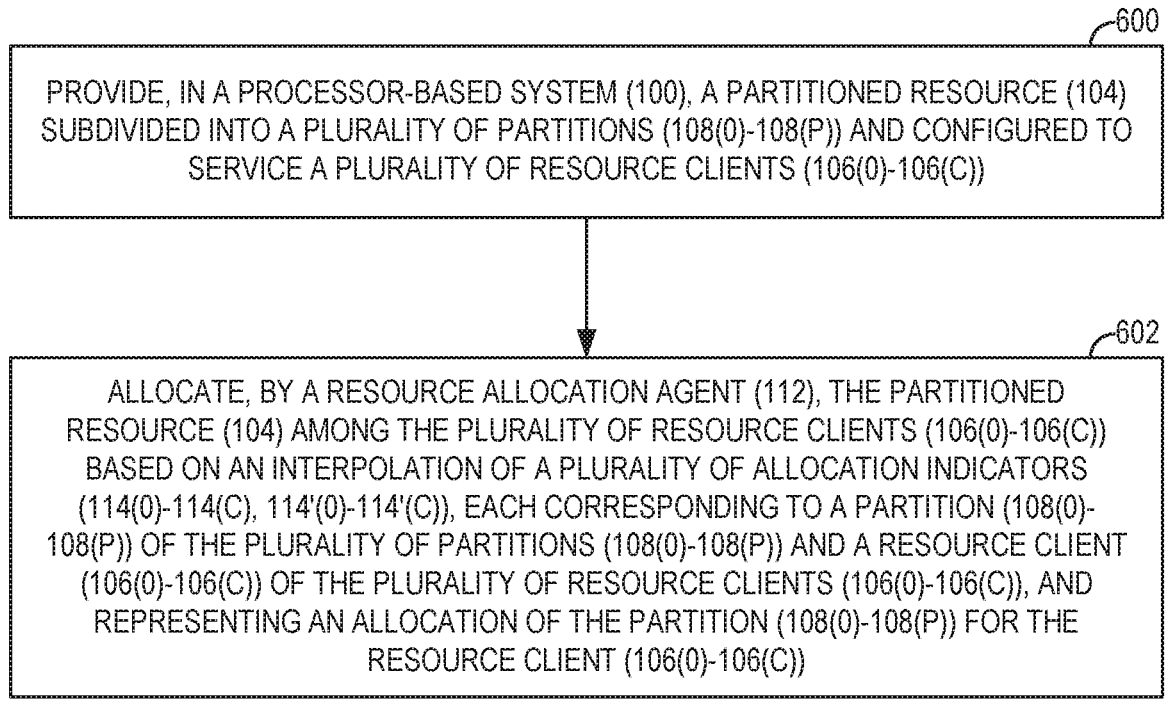
FIG. 6 is a flowchart illustrating an exemplary process for providing fine-grained QoS control using interpolation for partitioned resources by the resource allocation agent of FIG. 1.

FIG. 6 illustrates exemplary operations of the processor-based system 100 and the resource allocation agent 112 of FIG. 1 for providing fine-grained QoS control using interpolation for the partitioned resource 104. For the sake of clarity, elements of FIG. 1 are referenced in describing FIG. 6. In FIG. 6, operations begin with the processor-based system 100 providing the partitioned resource 104 subdivided into a plurality of partitions 108(0)-108(P) and configured to service a plurality of resource clients 106(0)-106(C) (block 600). In this regard, the processor-based system 100 may be referred to herein as "a means for providing a partitioned resource subdivided into a plurality of partitions and configured to service a plurality of resource clients."

The resource allocation agent 112 (e.g., the cache controller 200 of FIG. 2 and/or the MMU 400 of FIG. 4, as non-limiting examples) then allocates the partitioned resource 104 among the plurality of resource clients 106(0)-106(C) based on an interpolation of a plurality of allocation indicators 114(0)-114(C), 114'(0)-114'(C), each corresponding to a partition 108(0)-108(P) of the plurality of partitions 108(0)-108(P) and a resource client 106(0)-106(C) of the plurality of resource clients 106(0)-106(C), and representing an allocation of the partition 108(0)-108(P) for the resource client 106(0)-106(C) (block 602). Accordingly, the resource allocation agent 112 may be referred to herein as "a means for allocating the partitioned resource among the plurality of resource clients based on an interpolation of a plurality of allocation indicators, each corresponding to a partition of the plurality of partitions and a resource client of the plurality of resource clients, and representing an allocation of the partition for the resource client."

Figure 7:
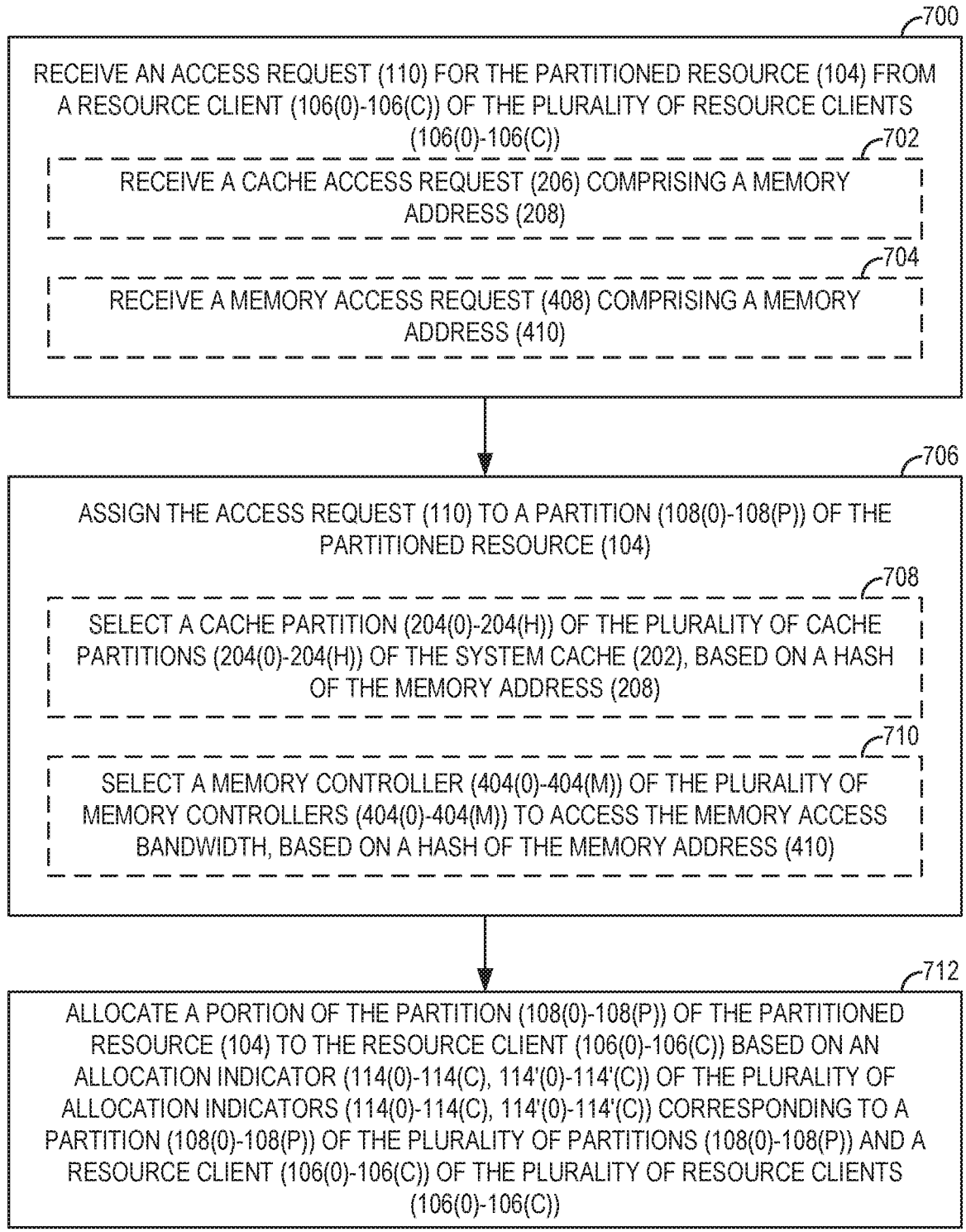
FIG. 7 is a flowchart illustrating further exemplary operations of the resource allocation agent of FIG. 1 for receiving and assigning access requests to partitions of a partitioned resource.

To illustrate further exemplary operations of the resource allocation agent 112 of FIG. 1 for receiving and assigning an access request, such as the access request 110 of FIG. 1, to the partitions 108(0)-108(P) of the partitioned resource 104, FIG. 7 is provided. Elements of FIGS. 1-5 are referenced in describing FIG. 7, for the sake of clarity. Operations in FIG. 7 begin with the resource allocation agent 112 receiving the access request 110 for the partitioned resource 104 from a resource client 106(0)-106(C) of the plurality of resource clients 106(0)-106(C) (block 700). In aspects of the processor-based system 100 providing the system cache 202 of FIG. 2, operations of block 700 for receiving the access request 110 may be carried out by the cache controller 200, and may comprise receiving a cache access request 206 comprising a memory address 208 (block 702). Likewise, aspects of the processor-based system 100 including the shared system memory 406 of FIG. 4 may provide that operations of block 700 for receiving the access request 110 may be carried out by the MMU 400, and may comprise receiving a memory access request 408 comprising a memory address 410 (block 704).

Next, the access request 110 is assigned to a partition 108(0)-108(P) of the partitioned resource 104 (block 706). Operations of block 706 for assigning the access request 110 according to the aspects illustrated in FIGS. 2 and 3 may comprise selecting a cache partition 204(0)-204(H) of the plurality of cache partitions 204(0)-204(H) of the system cache 202, based on a hash of the memory address 208 (block 708). In aspects illustrated in FIGS. 4 and 5, operations of block 706 for assigning the access request 110 may comprise selecting a memory controller 404(0)-404(M) of the plurality of memory controllers 404(0)-404(M) to access the memory access bandwidth, based on a hash of the memory address 410 (block 710). The resource allocation agent 112 (e.g., the cache controller 200 of FIG. 2 and/or the MMU 400 of FIG. 4, as non-limiting examples) allocates a portion of the partition 108(0)-108(P) of the partitioned resource 104 to the resource client 106(0)-106(C) based on an allocation indicator 114(0)-114(C), 114'(0)-114'(C) of the plurality of allocation indicators 114(0)-114(C), 114'(0)-114'(C), each corresponding to a partition 108(0)-108(P) of the plurality of partitions 108(0)-108(P) and a resource client 106(0)-106(C) of the plurality of resource clients 106(0)-106(C) (block 712).

Providing fine-grained QoS control using interpolation for partitioned resources in processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
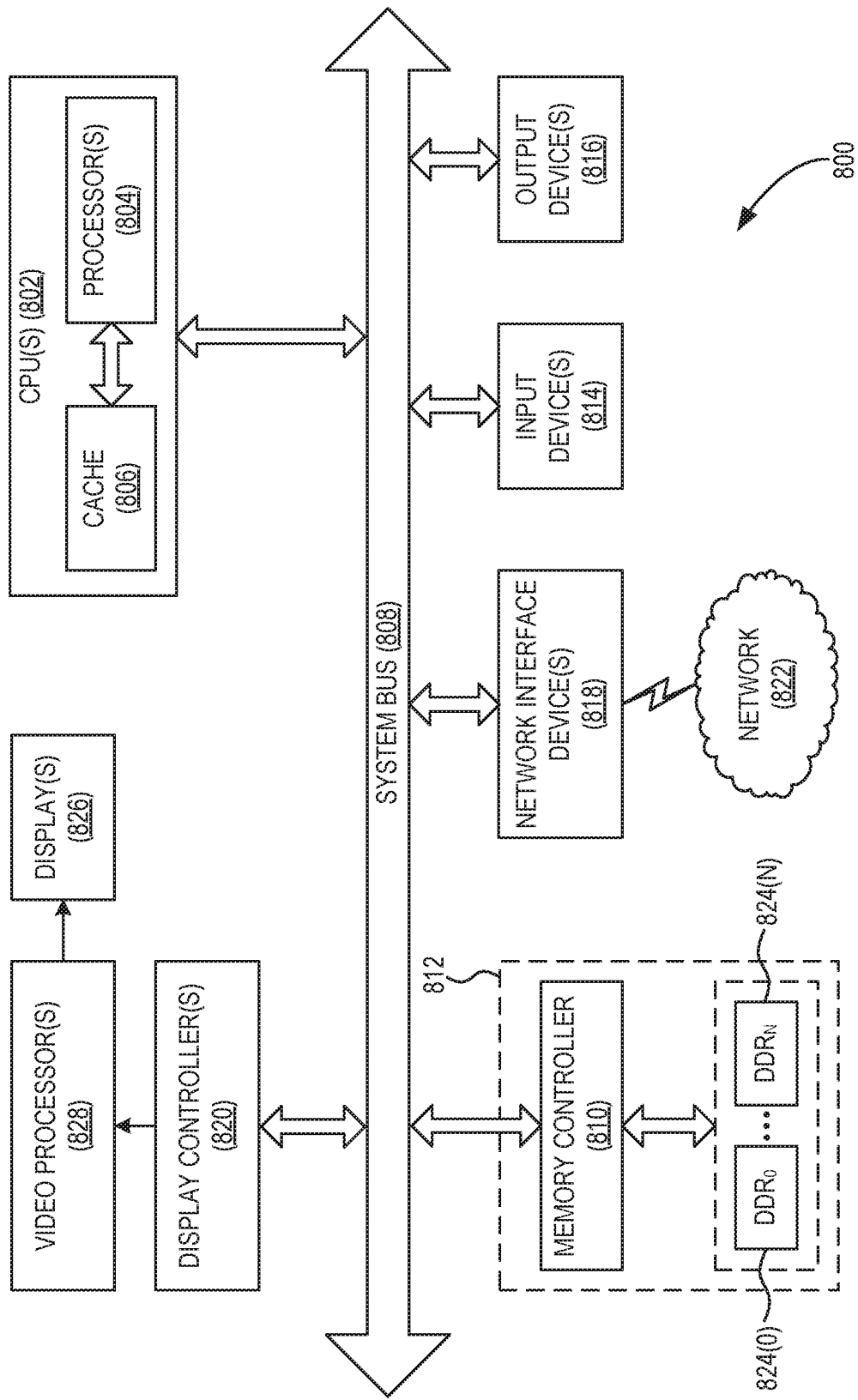
FIG. 8 is a block diagram of an exemplary processor-based system that can include the resource allocation agent of FIG. 1.

In this regard, FIG. 8 illustrates an example of a processor-based system 800 that corresponds to the processor-based system 100 of FIGS. 1, 2, and 4, and that can employ the resource allocation agent 112 illustrated in FIG. 1. The processor-based system 800 includes one or more CPUs 802, each including one or more processors 804. The CPU(s) 802 may have cache memory 806 that is coupled to the processor(s) 804 for rapid access to temporarily stored data, and that in some aspects may comprise the resource allocation agent 112 of FIG. 1. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. According to some aspects, the memory controller 810 may correspond to the memory controllers 404(0)-404(M) of FIG. 4.

Other master and slave devices can be connected to the system bus 808. As illustrated in FIG. 8, these devices can include a memory system 812, one or more input devices 814, one or more output devices 816, one or more network interface devices 818, and one or more display controllers 820, as examples. In some aspects, the memory system 812 may comprise the resource allocation agent 112 of FIG. 1. The input device(s) 814 can include any type of input device, including but not limited to input keys, switches, voice processors, etc. The output device(s) 816 can include any type of output device, including, but not limited to, audio, video, other visual indicators, etc. The network interface device(s) 818 can be any devices configured to allow exchange of data to and from a network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include one or more memory units 824(0)-824(N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A processor-based system for providing fine-grained Quality of Service (QoS) control of partitioned resources, comprising:
    a partitioned resource subdivided into a plurality of partitions and configured to service a plurality of resource clients;
    a plurality of allocation indicators, each corresponding to a partition of the plurality of partitions and a resource client of a plurality of resource clients, wherein each allocation indicator of the plurality of allocation indicators corresponds to a unique combination of a resource client and a partition; and
    a resource allocation agent configured to allocate the partitioned resource among the plurality of resource clients based on an interpolation of the plurality of allocation indicators for each resource client of the plurality of resource clients, such that each resource client is allocated a percentage of the partitioned resource equal to an average of allocations of the plurality of partitions indicated by the plurality of allocation indicators for the resource client.

2. The processor-based system of claim 1, configured to allocate the partitioned resource among the plurality of resource clients based on the interpolation of the plurality of allocation indicators for each resource client of the plurality of resource clients by being configured to:
    receive an access request for the partitioned resource from a resource client of the plurality of resource clients;
    assign the access request to a partition of the partitioned resource; and
    allocate a portion of the partition of the partitioned resource to the resource client based on an allocation indicator of the plurality of allocation indicators corresponding to the partition and the resource client.

3. The processor-based system of claim 2, wherein:
    the partitioned resource comprises a system cache;
    the resource allocation agent comprises a cache controller;
    the plurality of partitions comprises a plurality of cache partitions of the system cache; and
    the plurality of allocation indicators comprises a plurality of way masks each indicating one or more cache ways of a corresponding cache partition of the plurality of cache partitions that are allocated to a corresponding resource client of the plurality of resource clients.

4. The processor-based system of claim 3, wherein the resource allocation agent is configured to:
    receive the access request for the partitioned resource from the resource client of the plurality of resource clients by being configured to receive a cache access request comprising a memory address; and
    assign the access request to the partition of the partitioned resource by being configured to select a cache partition of the plurality of cache partitions of the system cache, based on a hash of the memory address.

5. The processor-based system of claim 2, wherein:
    the partitioned resource comprises a plurality of memory access bandwidth providers to a shared system memory;
    the resource allocation agent comprises a memory management unit (MMU);
    the plurality of partitions comprises a plurality of memory controllers configured to access the shared system memory; and
    the plurality of allocation indicators comprises a plurality of memory stride values each indicating a relative weight to be applied by a corresponding memory controller of the plurality of memory controllers for each memory access operation for a corresponding resource client of the plurality of resource clients.

6. The processor-based system of claim 5, wherein the resource allocation agent is configured to:
    receive the access request for the partitioned resource from the resource client of the plurality of resource clients by being configured to receive a memory access request comprising a memory address; and
    assign the access request to the partition of the partitioned resource by being configured to select a memory controller of the plurality of memory controllers to access the shared system memory, based on a hash of the memory address.

7. The processor-based system of claim 1 integrated into an integrated circuit (IC).

8. The processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor-based system for providing fine-grained Quality of Service (QoS) control of partitioned resources, comprising a means for allocating a partitioned resource, subdivided into a plurality of partitions, among a plurality of resource clients based on an interpolation of a plurality of allocation indicators, each corresponding to a partition of the plurality of partitions and a resource client of the plurality of resource clients, wherein each allocation indicator of the plurality of allocation indicators corresponds to a unique combination of a resource client and a partition, such that each resource client is allocated a percentage of the partitioned resource equal to an average of allocations of the plurality of partitions indicated by the plurality of allocation indicators for the resource client.

10. A method for providing fine-grained Quality of Service (QoS) control of partitioned resources, comprising allocating, by a resource allocation agent of a processor-based system, a partitioned resource, subdivided into a plurality of partitions, among a plurality of resource clients based on an interpolation of a plurality of allocation indicators, each corresponding to a partition of the plurality of partitions and a resource client of the plurality of resource clients, wherein each allocation indicator of the plurality of allocation indicators corresponds to a unique combination of a resource client and a partition, such that each resource client is allocated a percentage of the partitioned resource equal to an average of allocations of the plurality of partitions indicated by the plurality of allocation indicators for the resource client.

11. The method of claim 10, wherein allocating the partitioned resource among the plurality of resource clients based on the interpolation of the plurality of allocation indicators comprises:
receiving an access request for the partitioned resource from a resource client of the plurality of resource clients;
assigning the access request to a partition of the partitioned resource; and
allocating a portion of the partition of the partitioned resource to the resource client based on an allocation indicator of the plurality of allocation indicators corresponding to the partition and the resource client.

12. The method of claim 11, wherein:
the partitioned resource comprises a system cache;
the resource allocation agent comprises a cache controller;
the plurality of partitions comprises a plurality of cache partitions of the system cache; and
the plurality of allocation indicators comprises a plurality of way masks each indicating one or more cache ways of a corresponding cache partition of the plurality of cache partitions that are allocated to a corresponding resource client of the plurality of resource clients.

13. The method of claim 12, wherein:
receiving the access request for the partitioned resource from the resource client of the plurality of resource clients comprises receiving a cache access request comprising a memory address; and
assigning the access request to the partition of the partitioned resource comprises selecting a cache partition of the plurality of cache partitions of the system cache based on a hash of the memory address.

14. The method of claim 11, wherein:
the partitioned resource comprises a plurality of memory access bandwidth providers to a shared system memory;
the resource allocation agent comprises a memory management unit (MMU);
the plurality of partitions comprises a plurality of memory controllers configured to access the shared system memory; and
the plurality of allocation indicators comprises a plurality of memory stride values each indicating a relative weight to be applied by a corresponding memory controller of the plurality of memory controllers for each memory access operation for a corresponding resource client of the plurality of resource clients.

15. The method of claim 14, wherein:
receiving the access request for the partitioned resource from the resource client of the plurality of resource clients comprises receiving a memory access request comprising a memory address; and
assigning the access request to the partition of the partitioned resource comprises selecting a memory controller of the plurality of memory controllers based on a hash of the memory address.

16. A non-transitory computer-readable medium having stored thereon computer-executable instructions which, when executed by a processor, cause the processor to allocate a partitioned resource, subdivided into a plurality of partitions, among a plurality of resource clients based on an interpolation of a plurality of allocation indicators, each corresponding to a partition of the plurality of partitions and a resource client of the plurality of resource clients, wherein each allocation indicator of the plurality of allocation indicators corresponds to a unique combination of a resource client and a partition, such that each resource client is allocated a percentage of the partitioned resource equal to an average of allocations of the plurality of partitions indicated by the plurality of allocation indicators for the resource client.

17. The non-transitory computer-readable medium of claim 16 having stored thereon computer-executable instructions which, when executed by a processor, further cause the processor to allocate the partitioned resource among the plurality of resource clients based on the interpolation of the plurality of allocation indicators by causing the processor to:
receive an access request for the partitioned resource from a resource client of the plurality of resource clients;
assign the access request to a partition of the partitioned resource; and
allocate a portion of the partition of the partitioned resource to the resource client based on an allocation indicator of the plurality of allocation indicators corresponding to the partition and the resource client.

18. The non-transitory computer-readable medium of claim 17, wherein:
the partitioned resource comprises a system cache;

the resource allocation agent comprises a cache controller;

the plurality of partitions comprises a plurality of cache partitions of the system cache; and the plurality of allocation indicators comprises a plurality of way masks each indicating one or more cache ways of a corresponding cache partition of the plurality of cache partitions that are allocated to a corresponding resource client of the plurality of resource clients.

19. The non-transitory computer-readable medium of claim 18 having stored thereon computer-executable instructions which, when executed by a processor, further cause the processor to:

receive the access request for the partitioned resource from the resource client of the plurality of resource clients by causing the processor to receive a cache access request comprising a memory address; and assign the access request to the partition of the partitioned resource by causing the processor to select a cache partition of the plurality of cache partitions of the system cache based on a hash of the memory address.

20. The non-transitory computer-readable medium of claim 17, wherein:

the partitioned resource comprises a plurality of memory access bandwidth providers to a shared system memory;

the resource allocation agent comprises a memory management unit (MMU);

the plurality of partitions comprises a plurality of memory controllers configured to access the shared system memory; and the plurality of allocation indicators comprises a plurality of memory stride values each indicating a relative weight to be applied by a corresponding memory controller of the plurality of memory controllers for each memory access operation for a corresponding resource client of the plurality of resource clients.

21. The non-transitory computer-readable medium of claim 20 having stored thereon computer-executable instructions which, when executed by a processor, further cause the processor to:

receive the access request for the partitioned resource from the resource client of the plurality of resource clients by causing the processor to receive a memory access request comprising a memory address; and assign the access request to the partition of the partitioned resource by causing the processor to select a memory controller of the plurality of memory controllers based on a hash of the memory address.

\* \* \* \* \*